US012249793B2

(12) United States Patent
Perry et al.

(10) Patent No.: US 12,249,793 B2
(45) Date of Patent: Mar. 11, 2025

(54) M2 CONNECTOR WITH INCREASED AMPACITY

(71) Applicant: Intel Corporation, Santa Clara, CA (US)

(72) Inventors: Richard Perry, Portland, OR (US); Robert Schum, Roseburg, OR (US); Mythili Hegde, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 17/559,688

(22) Filed: Dec. 22, 2021

(65) Prior Publication Data

US 2022/0166166 A1 May 26, 2022

Related U.S. Application Data

(60) Provisional application No. 63/177,282, filed on Apr. 20, 2021.

(51) Int. Cl.

| | |
|---|---|
| ***H01R 13/64*** | (2006.01) |
| ***H01R 12/72*** | (2011.01) |
| ***H01R 12/73*** | (2011.01) |
| ***H01R 13/03*** | (2006.01) |
| ***H01R 13/04*** | (2006.01) |
| ***H01R 13/10*** | (2006.01) |

(52) U.S. Cl.

CPC ........... *H01R 13/64* (2013.01); *H01R 12/727* (2013.01); *H01R 13/03* (2013.01); *H01R 13/04* (2013.01); *H01R 13/10* (2013.01); *H01R 12/732* (2013.01); *H01R 2201/04* (2013.01); *H01R 2201/06* (2013.01); *H01R 2201/24* (2013.01)

(58) Field of Classification Search

CPC ........ H01R 13/03; H01R 13/04; H01R 13/10; H01R 13/64; H01R 13/645; H01R 13/6453; H01R 13/6456; H01R 12/727; H01R 12/732; H01R 2201/04; H01R 2201/06; H01R 2201/24

USPC ........................................................ 439/68, 79

See application file for complete search history.

(56) References Cited

U.S. PATENT DOCUMENTS

| | | | | |
|---|---|---|---|---|
| 10,461,467 B2 * | 10/2019 | Eppley | ................ | H01R 12/721 |
| 10,488,893 B1 * | 11/2019 | Keilers | .................. | G06F 1/186 |
| 11,262,813 B2 * | 3/2022 | Tsorng | .................. | H05K 1/141 |
| 11,715,909 B2 * | 8/2023 | Zhao | .................. | H01R 12/727<br>439/108 |
| 2022/0166166 A1 * | 5/2022 | Perry | .................... | H01R 13/04 |

* cited by examiner

*Primary Examiner* — Khiem M Nguyen

(74) *Attorney, Agent, or Firm* — Banner & Witcoff Ltd.

(57) ABSTRACT

Disclosed embodiments include a modified M.2 interface that is configured to allow an increased current capacity on power-carrying pins. The power-carrying pins are implemented using an alloy that can sustain current levels in excess of those specified in the M.2 standard while remaining within M.2 standard specified temperature limits. Sockets and corresponding cards in embodiments are modified so that a card requiring the higher current capacity cannot fit into a legacy M.2 standard socket, while a legacy M.2 card can fit into a modified high current M.2 socket. Other embodiments may be described and/or claimed.

20 Claims, 6 Drawing Sheets

PRIOR ART

M2 CONNECTOR WITH INCREASED AMPACITY

CROSS-REFERENCE TO RELATED APPLICATIONS

This application claims priority to U.S. Provisional Application No. 63/177,282, filed on 20 Apr. 2021, the contents of which are hereby incorporated by this reference as if fully stated herein.

TECHNICAL FIELD

Embodiments of the present disclosure generally relate to the field of computing, and in particular to mounted computer expansion cards and associated connectors.

BACKGROUND

The M.2 standard is a specification for an internal expansion interface that evolved from the older mSATA interface for storage cards, and as such may be used to attach various devices such as PCI Express Mini Cards. The M.2 standard is compact, and finds increasing use in portable systems such as laptops, ultrabooks, tablets, and small form factor desktops and nettop computers. The M.2 standard has been designed to maximize usage of space on a computer's motherboard, while minimizing the footprint of a given module. Types of peripherals or modules that may utilize the M.2 standard can include flash storage devices, other storage devices, Wi-Fi adapters, Bluetooth adapters, satellite navigation modules, Near-Field Communications (NFC) modules, digital radio, WiGig adapters, Wireless Wide Area Networking (WWAN) adapters (such as cellular modules), and other peripherals or modules that can provide useful functionality to a tablet or small form factor computer. As it is an expansion interface, M.2 compatible cards are typically inserted into the tablet or computer, such as to a socket that is mounted to the computer's motherboard. In some implementations, however, a peripheral, such as a storage device like a solid state disk, may be directly soldered to the motherboard, using the M.2 standard as the interface but without being removable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
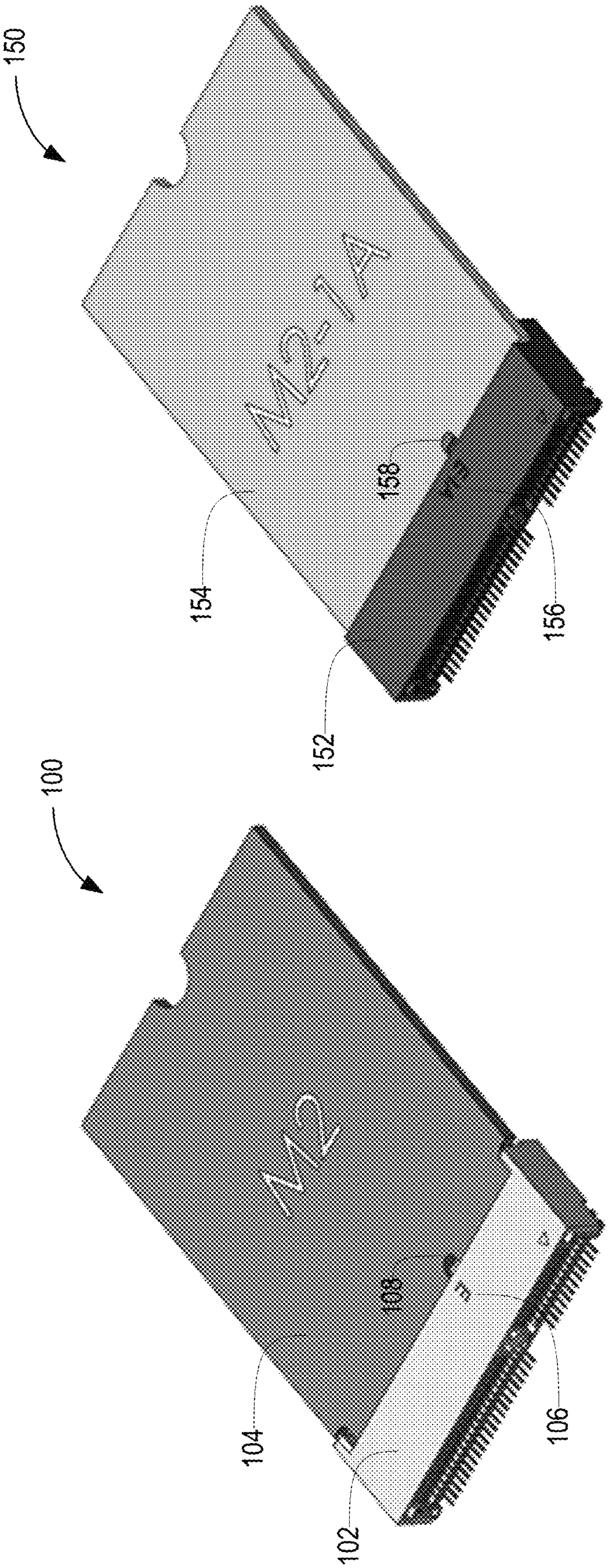
PRIOR ART FIG. 1
FIG. 1 illustrates perspective views of an M.2 interface according to the prior art, and an example embodiment of a modified M.2 interface to provide one amp of current per pin, in accordance with various embodiments.

Embodiments described herein are directed to M2 connector amperage improvements that enables advanced feature capabilities and performance while maintaining the same or similar hardware (HW) of other M.2 devices.

M.2 is a standard for relatively compact expansion cards that has found particular use in implementations where space is at a premium but expansion capabilities are still desirable, such as current-generation laptops and ultrabooks. Originating as the Next-Generation Form Factor, the M.2 standard has standardized electrical requirements for each add-in card device. The M.2 standard provides for a standard socket size that can be implemented with different keys to support various types of modules, the differently keyed sockets each providing different levels of power and connection bandwidth. In typical implementations, there are three configurations currently in use: Socket 1, Socket 2, and Socket 3, each providing an increasing amount of power and bandwidth. Each M.2 device, according to the standard, is limited by current handling capability of 500 mA per pin. The M.2 interface employs up to 67 pins in current implementations and, as is typical in electronic interfaces, each pin may have different functions, with some pins serving as data lines, some serving as power lines, and some serving as ground connections. The maximum current handling capability of the M.2 interface is thus determined by the number of power pins available, which depends on a given combination of socket and expansion card. For example, an M.2 interface implemented with a Socket 1 configuration has four power pins out of the possible 67, providing up to two amps of current handling. This translates to a total power of 3.3V×4 pin×0.5 A p/pin=6.6 W. A Socket 2 configuration has five power pins, providing 2.5 amps of current, and 8.25 W of power. A Socket 3 configuration has nine power pins, yielding 4.5 amps of current, and 14.85 W of power.

As mentioned above, the M.2 interface can be used to equip computers with wireless connectivity by installation of a wireless modem or transceiver, such as a cellular modem or another suitable WWAN technology. Thus far, the power capable of being supplied by the M.2 interface, as discussed immediately above, has been sufficient to meet the demands of wireless modems and transceiver cards. With the rise of high bandwidth next-generation communications technology, e.g. 5G devices, demand for such 5G modems and similar high-bandwidth devices is likewise increasing. However, these next-generation devices typically demand higher power over current WWAN technologies. These greater power demands can pose a challenge for the M.2 interface. Specifically, the power demands of many currently available and upcoming 5G modems exceeds the nominal power provided by the various socket configurations provided via the M.2 interface. Attempting to install such a device in an existing M.2 socket may result in unreliable operation at best, and component damage due to excessive current draw and associated thermal effects at worst. At present, reduction in power consumption of such next-generation devices is not feasible, particularly when a wireless device must be capable of radiating RF power levels dictated by a separate communications protocol standard.

Upcoming module or card designs with power requirements that exceed what the M.2 interface specifies are thus at risk in new platform designs because there are no standard connectors available in industry to support the increased power requirements. While different connectors and interfaces that support higher power are either forthcoming or in development, such connectors and interfaces are either not yet available or have not yet been standardized. Accordingly, there are no standardized peripherals available comparable to the wide array of different modules, e.g. solid state disks, communication modules, etc., that are currently available for M.2 sockets. Using a non-standardized peripheral interface in a system limits the user of such a system to only those peripherals specifically made for the non-standard interface, if any are available, which can tie the user to one or a few specific manufacturers. It further prevents interchangeability with other manufacturers, and so runs the risk of the peripheral having a relatively short life if support for the non-standardized interface is subsequently dropped. Alternatively, modules could be integrated into a system motherboard or otherwise soldered into place to supply the necessary power, but at the sacrifice of future upgradability. Still further, either solution potentially takes up more physical space if providing one or more M.2 sockets is also desired, which may be problematic or not feasible in applications where space is at a premium.

Because M.2 is a standard, additional power pins cannot be introduced in the M.2 specification due to non-availability of vendor defined pins, which could otherwise increase the power available to a module configured for a given socket. Reassigning pins dedicated to other functions to serve as power pins would require either revamping the M.2 interface standard, or creating a modified interface that used M.2 sockets and connectors, but would otherwise be non-compliant. Revamping the M.2 interface standard would require the agreement of multiple parties as well as costly regulatory recertification. Creating a modified, non-certified or standard interface essentially creates a proprietary interface that reuses the M.2 form factor, which could lead to a user mistakenly inserting an M.2 module that would not work properly in the modified interface. In either instance, compatibility with existing M.2 modules designed to comply with the existing M.2 interface standard would be compromised at best, if not outright eliminated.

Considering the foregoing, disclosed embodiments include modifications to the M.2 interface, referred to variously herein as M.2-1A, that employ power pins capable of carrying at least one amp of current, double the 0.5 A rating provided by the existing M.2 interface. This greater ampacity may be enabled, in embodiments, by using various copper alloys with lower resistance, so that at least one amp of power per pin can be accommodated while still remaining within the M.2 specification thermal limits. The physical layout of the pins is unchanged. By increasing the ampacity of the power pins, newer modules that have greater power demands, such as WWAN and 5G modems, can be supported and powered. Retaining the standard pin layout ensures full compatibility with existing M.2 modules, which do not require the higher ampacity.

Because backward compatibility is provided, the physical structure of the M.2 socket and of the corresponding edge connectors of modules that require higher current capacity is modified. In the disclosed embodiments, the modifications ensure existing M.2 modules will connect to a modified M.2 socket, but a module requiring the higher current capacity will not connect to an existing, non-modified M.2 socket. With these changes, modules that require the higher current capacity are prevented from use in standard M.2 sockets, where the higher current demand could either damage the host system or result in unreliable or erratic behavior, while existing M.2 modules can be inserted into either standard or modified M.2 sockets and retain full functionality. In embodiments, the M.2 socket is modified to remove a relatively small amount of plastic from either side of the connector to make a 1A version. The corresponding higher ampacity module connector is also modified so that the cut-outs on either side of the connector are shallower. These shallower cut-outs are accommodated in the modified socket so that the connector makes full contact with the socket pins. However, the shallower cut-outs prevent the modified module from being inserted into a standard 0.5 A M.2 socket, as the shallower cut-outs are blocked by the existing (non-removed) plastic on either side of the connector, which prevents the modified module from fully inserting into a standard M.2 socket. Thus, in embodiments, 100% backward compatibility is maintained.

These embodiments provide at least the following benefits over a different or proprietary design: (1) hardware reliability is maintained with low power connector; (2) there is no need for regulatory spin of designs in progress; (3) there is no increase on system area consumed by module or connector; (4) there is minimal change to enable the modifications on modules and connectors; (5) there is backwards compatibility for all designs with the new connector; (6) embodiments keep the existing M.2 ecosystem which includes interoperability and supply chain management, while still supporting multiple product segments; (7) embodiments enable M.2 devices to fully achieve device capabilities that are not limited by connector; (8) embodiments enable connections across all M.2 add-in cards for SSD, WWAN, and Wi-Fi; and (9) embodiments prevent safety issues with high power devices.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

The M.2 interface standard is capable of supporting an array of different devices with varying data and/or power needs. The M.2 interface standard accordingly specifies various keys that correspond to different types of devices that may specify different power/data requirements within the M.2 standard. As discussed above, these differing power requirements are addressed by allocating a greater or fewer number of power pins, with each pin capable of delivering up to a standard-specified amount of current. To avoid the possibility of a mismatch between a particular device that may require a greater amount of power than a particular socket can deliver (and/or different data line requirements), each of the various keys is associated with a pre-established arrangement of pin assignments, e.g. a specified number of power pins, data pins/lanes, etc. A card is accordingly fitted with an edge connector that is keyed to a key that meets the card's particular power and/or data needs, so that it can only be inserted into a connector that is configured with the same key.

The M.2 standard specifies a number of different keys, with the "A", "B", "E", and "M" keys commonly in use. Sockets configured to accept these various keys may be designated based upon the number of data lanes and supported data protocols, as well as power handling capacity. Socket 1, Socket 2, and Socket 3, mentioned above, are the most commonly used socket designations and may correspond to PCIe ×1, PCIe ×2 or SATA, and PCIe ×4, respectively, in addition to the previously-discussed varying power handling capacities. As the key designators also correspond to supported data lanes and protocols, a Socket 1 may be configured to accept "A" or "E" keys, a Socket 2 may be configured to accept "B" keys, and a Socket 3 may be configured to accept "B" or "M" keys, for example. In some implementations where a particular card could function with pin arrangements of multiple keys, the edge connector may be dual-keyed, e.g. a card may be equipped with an edge connector capable of inserting into either "B" or "M" keyed sockets.

The M.2 interface utilizes a single regulated power rail of 3.3 V provided by the platform. The main 3.3 V and the VIO voltage rail sources on the platform should always be on and available during the system's stand-by/suspend state to support devices that may require at least some continuous low level of operation and/or to provide rapid wake-up. The number of 3.3 V pins for any given pinout, which is typically specified for a particular key, is determined by the maximum required instantaneous current typical of the solutions associated with each type of socket and the M.2 connector current handling capability per pin. The M.2 connector pin is defined as needing to support 500 mA/pin continuous. The electrical requirement of M.2 connector pins as defined in M.2 PCIe Revision 4.0 is given below:

| Description | Requirement |
|---|---|
| Low Level Contact Resistance | EIA-364-23<br>55 mΩ maximum (initial) per contact<br>20 mΩ maximum change allowed |
| Insulation Resistance | EIA-364-21<br>>5 × 108 Ω @ 500 V DC |
| Dielectric Withstanding Voltage | EIA-364-20<br>>300 V AC (RMS) @ Sea Level |
| Current Rating | 0.5 A/Power contact (continuous),<br>1.0 A/Power contact (less than 100 μs duration)<br>The temperature rise above ambient must not exceed 30° C.<br>The ambient condition is still air at 25° C.<br>EIA-364-70 Method 2 |
| Voltage Rating | 50 VAC per Contact |

As can be seen, for an example Socket 2 type, the average current is defined as 2.5 A (5× power pins), with a peak current for up to 5 A over a period of 100 microseconds. The sustained average power consumption can reach maximum up to 8.25 W, and any increase in power consumption beyond this will lead to a deviation from M.2 specification. A system equipped with a Socket 2 that so deviates from the M.2 specification may not be designed to handle such a high current on the pins, and damage and/or improper operation may result.

FIG. 1 illustrates perspective views of a legacy M.2 interface 100, labeled as M.2, and an example embodiment of a modified M.2 interface 150, labeled as M.2-1A. The M.2 interface 100 is comprised of a socket 102 with a corresponding inserted M.2 module or card 104. Similarly, the M.2-1A interface 150, supporting a per-pin continuous current of one amp, is comprised of socket 152 and corresponding inserted module or card 154. As can be seen, both interface 100 and interface 150 are otherwise identical in appearance. In the depicted implementation, sockets 102 and 152 are both indicated as an "E" keyed socket by designators 106 and 156. Designator 106 is labeled "E", and designator 156, corresponding to socket 152 with support for increased ampacity, is labeled as "E-1A" to indicate both the E-keyed socket configuration as well as the ability to provide up to one amp per power pin sustained, double the normal ampacity of an E-keyed M.2 socket. In both interfaces 100 and 150, the key mechanism 108 and 158, respectively, is visible. The structures of key mechanisms 108 and 158 are described in greater detail below.

Figure 2:
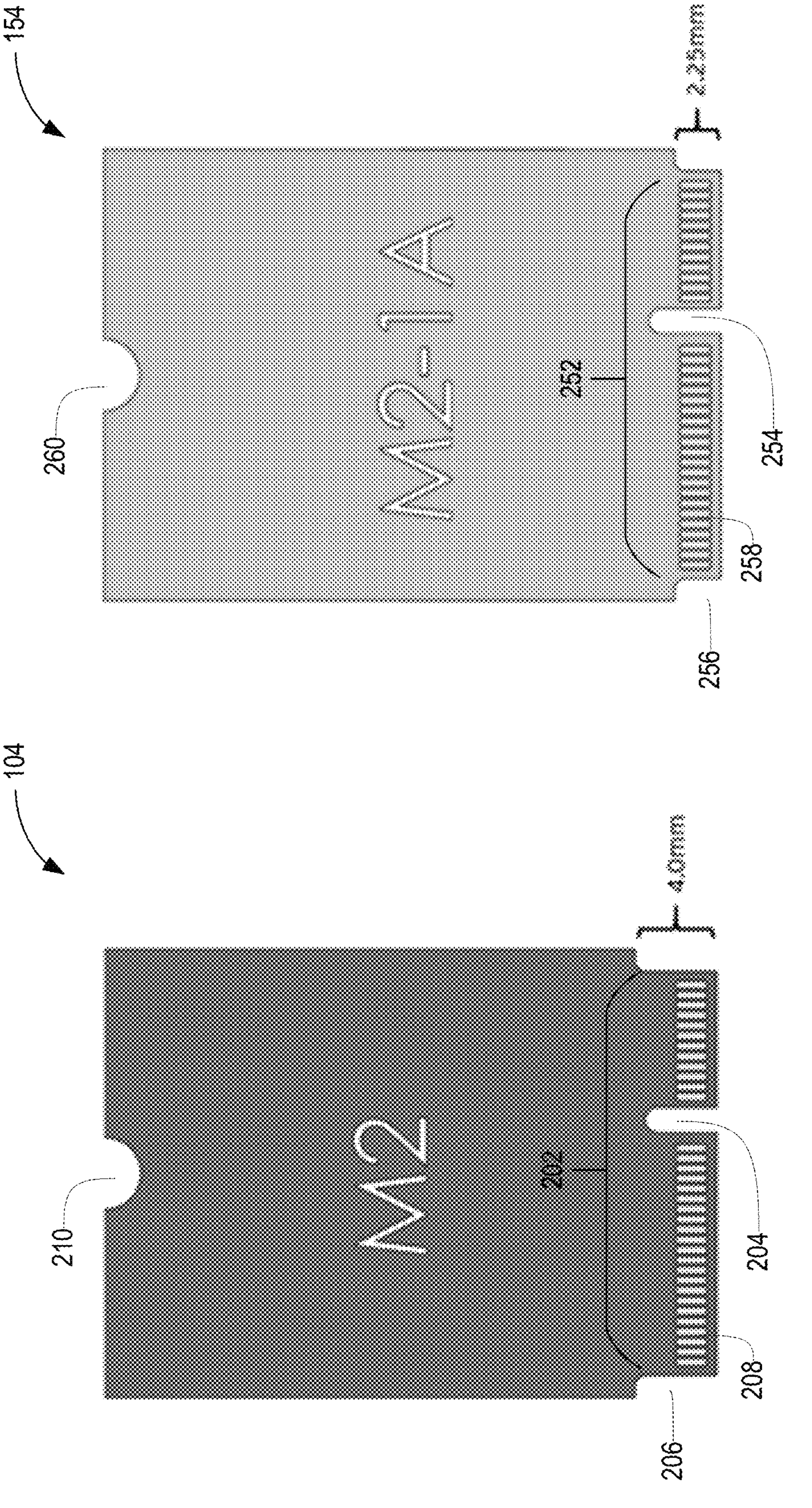
PRIOR ART FIG. 2
FIG. 2 illustrates top-down views of a legacy M.2 card and an embodiment of an M.2-1A card design, in accordance with various embodiments.

FIG. 2 illustrates top-down views of a card 104 equipped with a legacy M.2 edge connector and a card 154 equipped with an M.2-1A edge connector, in accordance with various embodiments. The legacy M.2 card 104 includes an edge connector 202 that includes a 4 mm length dimensioned cutout 206 on either side of the edge connector 202, with pins 208 and key slot 204 located on the edge connector. Put another way, edge connector 202 extends along the card 104's longitudinal axis approximately 4 mm from the card's body. As the edge connector 202 is of a narrower width than the body of the card 104, it forms 4 mm long cutouts 206 on either side. On an end opposite the edge connector 202 is a notch 210 for securing the card 104 to a substrate when inserted into a corresponding socket.

The example embodiment M.2-1A card 154 also includes a cutout 256 on either side of the edge connector 252, but in contrast to cutout 206, cutout 256 is only 2.25 mm dimensioned extension with connectors. As with card 104, edge connector 252 extends along the longitudinal axis of the card 104 2.25 mm but is narrower in width to form the 2.25 mm cutouts 256. Similar to card 104, edge connector 252 includes pins 258 and key slot 254, and a corresponding notch 260 opposite edge connector 252 to secure the card 154 to a substrate. In the case of both legacy M.2 card 104 and M.2-1A card 154, the layout of the pins complies with the M.2 standard. The pins may be disposed on one or both sides of the card, as required by the standard and a given card implementation.

Key slots 204 and 254 are part of key mechanisms 108 and 158, respectively, and each accepts a key, discussed below with reference to FIG. 3. The position of the key slot 204, 254 along the width of the edge connector 202, 252 is dictated by the type of keying for which the card 105, 154, is configured. It will be understood by a person skilled in the relevant art that the location of key slot 204, 254 along the edge connector 202, 252 varies depending upon how the card is keyed, e.g. A, B, E, and/or M, as discussed above. The M.2 interface standard dictates the placement of the keys/key slots, and embodiments of the disclosed M.2-1A interface comply with this placement. Differing placement of the key slot 204, 254, prevents the accidental insertion of a card into a slot that does not support the card's needed pin configuration.

Examination of FIG. 2 demonstrates that card 104 and card 154 are physically identical, save for the length of cutout 256 relative to cutout 206, with cutout 256 being shorter at 2.25 mm compared to 4 mm for cutout 206. The number, layout, and function of pins 208 and 258 will typically be identical, and in compliance with the existing M.2 interface standard. The position of key slots 204 and 254 likewise will typically be identical, in compliance with the M.2 interface standard for a given key, as discussed above. The length of 4 mm for cutout 206 is in accordance with the existing M.2 specification. The length of 2.25 mm for cutout 256 will be discussed further below with respect to FIGS. 4A and 4B, but should be relatively consistent across cards implementing the example M.2-1A interface disclosed herein (but different than the M.2 interface standard) if interchangeability between different M.2-1A cards and sockets is desired.

Figure 3:
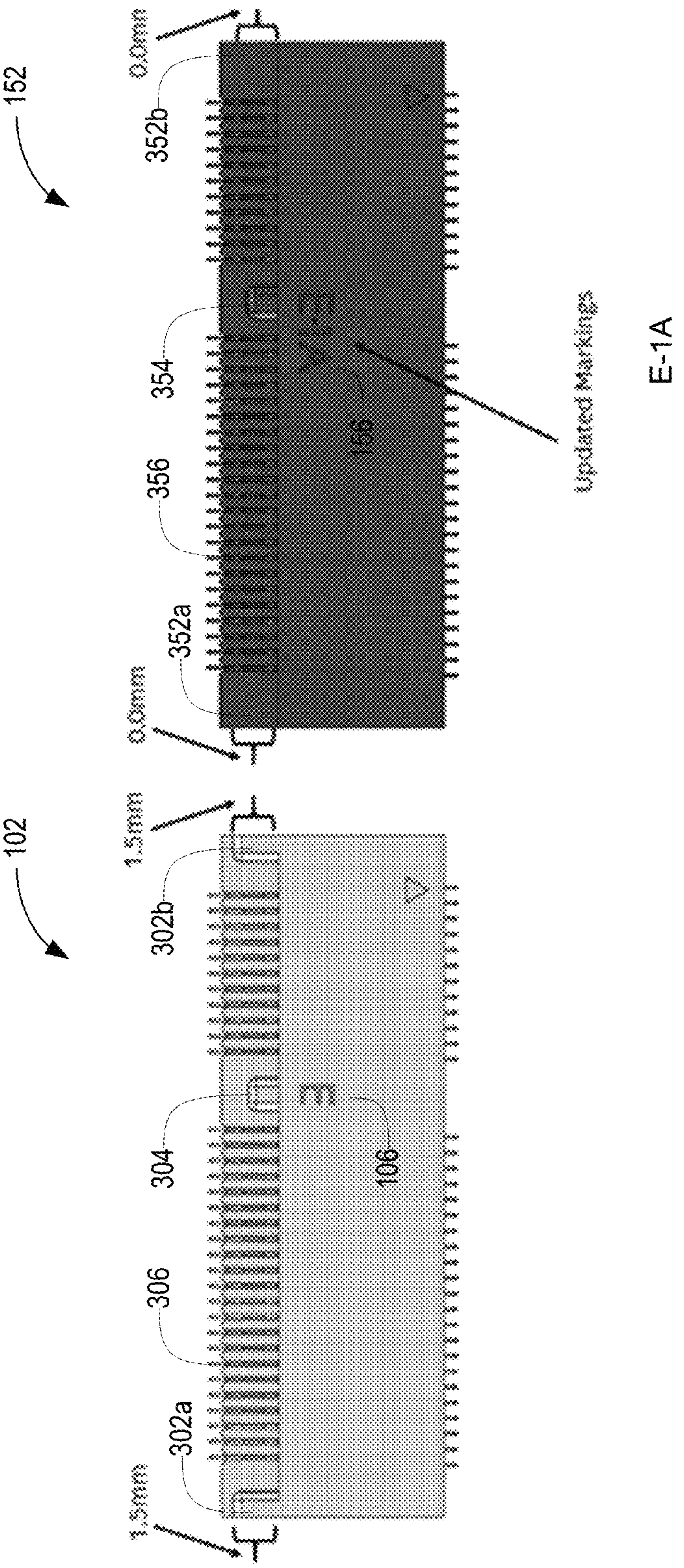
FIG. 3 illustrates top-down views of sockets of a legacy M.2 and an embodiment of an M.2-1A socket design, in accordance with various embodiments.

FIG. 3 illustrates top-down views of connectors of a legacy M.2 socket 102 and an M.2-1A socket 152, in accordance with various embodiments. Socket 102 includes a pair of protrusions 302*a* and 302*b* that flank either side of the connector, a key 304, and a plurality of connector pins 306. Also visible is designator 106, discussed above with respect to FIG. 1, which indicates the type of connector for which the socket 102 is keyed (in the depicted example, an "E" type key). The example M.2-1A socket 152, in comparison, includes a pair of lands 352*a* and 352*b*, essentially formed by the removal or non-placement of material that would otherwise form the protrusions 302*a* and 302*b*. Socket 152 also includes key 354, plurality of connector pins 356, and designator 156, in the depicted example, an "E-1A" type key, indicating that the socket 152 is capable of providing a sustained one amp per power pin. The placement of keys 304, 354 corresponds to the placement of the key slot on a card that is configured and keyed to insert into the socket 102, 152, respectively. As with key slots 204 and 254, the keys 304, 354 comprise part of key mechanism 108, 158, and act to prevent insertion of an M.2 card that requires a different pin configuration than provided by the socket 102, 152.

As with cards 104 and 154, sockets 102 and 152 are essentially identical, except for the existence of protrusions 302*a* and 302*b* on socket 102, and the lack or removal of such protrusions in favor of lands 352*a* and 352*b* on socket 152. Lands 352*a* and 352*b* are essentially the lack of protrusions such that lands 352*a* and 352*b* are level with the substrate around the plurality of connector pins 356, in various embodiments. As with the cutouts 256, lands 352*a* and 352*b* should be substantially consistent across cards implementing the example M.2-1A interface disclosed herein (but different than the M.2 interface standard) if interchangeability between different M.2-1A cards and sockets is desired.

The materials used to construct sockets 102 and 152 may be identical, using any material that is suitable to manufacture an M.2 standard compliant socket. However, the pins 258 of card 154 and corresponding connector pins 356 of socket 152 may be manufactured or fabricated from an alloy that is designed to handle the increased ampacity of one amp without exceeding the M.2 pin temperature specifications. For example, Corson 7025 alloy has been determined to be a suitable alloy for delivering one amp per pin within acceptable temperature limits. Other suitable alloys may likewise be employed. Further, different alloys may be employed for pins 258 from connector pins 356, so long as the alloys are chemically compatible. It should further be understood that, in some embodiments, only the pins that are required to carry at least one amp of current need be made from the suitable alloy, while other pins, e.g. data lines, that do not require the higher ampacity may be fabricated from an alloy, metal, or other material that is suitable for a legacy M.2 connector.

Figures 4A, 4B:
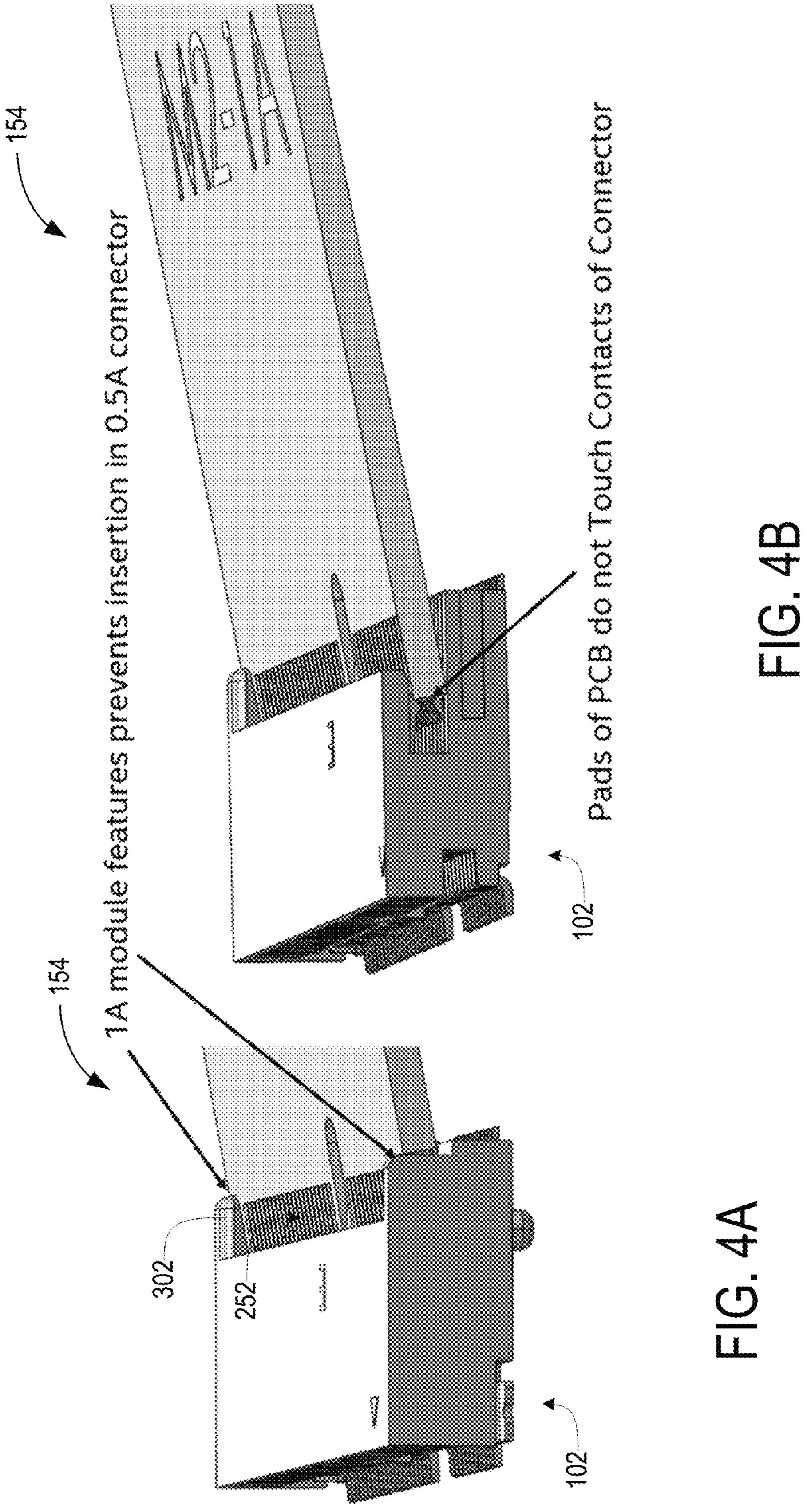
FIG. 4A is a perspective view that shows insertion of a card (or module) into a legacy M.2 socket, in accordance with various embodiments.
FIG. 4B is a cross-section view of FIG. 4A, illustrating how an M.2-1A card, according to various embodiments, is prevented from engaging with the pins of the legacy M.2 socket.

Turning to FIGS. 4A and 4B, a block diagram depicting an attempted insertion of a card (or module) according to an embodiment of the M.2-1A connector, such as card 154, into a legacy M.2 connector or socket 102, in accordance with various embodiments. Insertion of a legacy M.2 card into an M.2-1A connector proceeds in substantially the same fashion as insertion into a legacy M.2 connector, and is not discussed further. The attempted, but unsuccessful, insertion of card 154 into the legacy socket 102 shows a 1 A module or card feature that prevents insertion into a 0.5 A connector. Specifically, the cutouts 256 (FIG. 2) of the card 154, being less than 2.5 mm in length and, in embodiments, 2.25 mm in length, interact with protrusions 302 to prevent the edge connector 252 from fully inserting into socket 102 and thereby contacting the connector pins 306 of the socket 102. Each protrusion 302 of legacy M.2 socket 102 is approximately 1.5 mm in length, with the full depth of the socket 102 from the end of the protrusions 302 to the bottom of the socket being at least 4 mm. The enclosed portion of the socket that contains the connector pins 306 is thus approximately 2.5 mm in depth. The connector pins of the socket (not visible) extend from the bottom of the socket 102 towards its opening approximately 1 to 1.5 mm, leaving a space of approximately 1 to 1.5 mm of the enclosed socket before the connector pins may be contacted.

A legacy M.2 compliant card, such as card 104, has cutouts 206 that are 4 mm in length. This results in a corresponding edge connector depth of 4 mm, which allows both the 1.5 mm protrusions 302 on either side of the socket 102 to be accommodated while the edge connector of card 104 is able to traverse substantially the full depth of the enclosed socket portion to engage the connector pins of the socket 102. In contrast, the shorter 2.25 mm cutouts of card 154, in embodiments, when engaged with protrusions 302, prevent the edge connector of card 154 from fully inserting into the socket 102. The 2.25 mm depth of the example embodiment edge connector is prevented by protrusions 302 from extending more than approximately 0.75 mm into the enclosed socket, and so is stopped short of contacting the connector pins. Thus, in cards that embody the M.2-1A interface 150, pins 258 of the card 154 do not touch the connector pins 306 of a socket 102 that are only rated for 0.5 A continuous, thus resolving safety concerns that would otherwise arise if a card that required 1 A of current per pin were connected to a standard M.2 interface compliant socket. Furthermore, an inserted card is secured into position by the opposing notch 210, 260, which engages with a screw or post positioned a distance from the socket that is determined by the M.2 standard. The shallower depth of cutouts 256 when interacting with the protrusions 302 of a legacy M.2 socket prevent the M.2-1A card 154, in embodiments, from even being secured into place, as the notch 260 will overshoot, rather than align, with the securing screw or post.

This arrangement is more clearly shown in FIG. 4B. In cross-section, it can be seen that the shorter 2.25 mm cutouts, and corresponding 2.25 mm length edge connector, are prevented by protrusions 302 from allowing the pins on the edge connector 252 to contact the connector pins within socket 102. With reference to FIG. 3, the lack of protrusions 302 and the presence of lands 352, on an M.2-1A socket 152, allows the card 154 to fully insert into the M.2-1A socket 152 and contact its connector pins as the shorter 2.25 mm cutouts of card 154 are accommodated by lands 352, according to various embodiments. When fully inserted, the notch 260 will also properly align with its corresponding screw or post, and so allow the card 154 to be secured in place. The converse arrangement, where a legacy M.2 card 104 is inserted into an M.2-1A socket 152, poses no problem, as the lands 352 can equally accommodate the longer 4 mm cutouts of a legacy card 104, allowing for full insertion and backwards compatibility with all existing M.2 standard-compliant cards. As will be understood by a person skilled in the art, the insertion of a card with a lower current demand into a socket capable of delivering a relatively high current poses no danger.

While specific dimensions are listed above for the cutouts of M.2-1A cards, i.e. 2.25 mm, and the removal of protrusions 302 in favor of lands 352 are provided to allow corresponding M.2-1A cards to be inserted into an M.2-1A socket, it should be understood that the cutouts and/or lands may vary somewhat, depending upon the specifics of a given embodiment. These dimensions may vary to the extent that the pins of an M.2-1A card are prevented from touching the connector pins of a legacy M.2 socket, and legacy M.2 cards are allowed to fully insert into and connect with an embodiment M.2-1A card.

Figure 5:
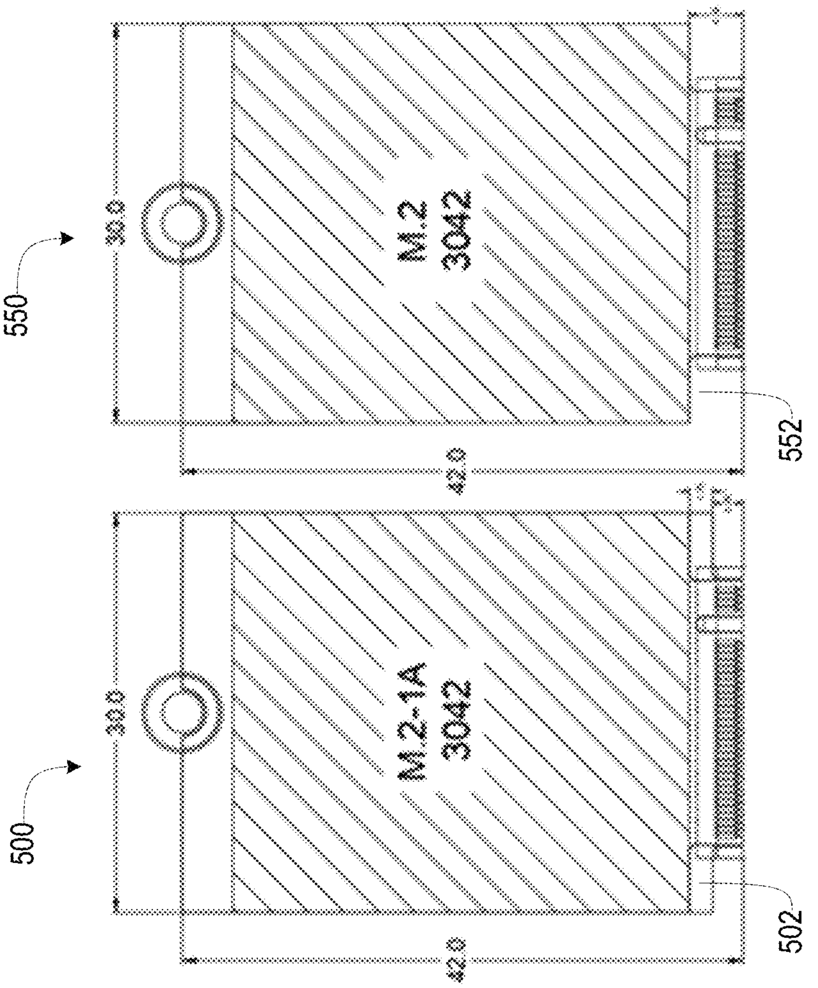
FIG. 5 illustrates schematics of a legacy M.2 and an M.2-1A card with connectors, in accordance with various embodiments.

FIG. 5 illustrates various schematics of legacy and M.2-1A cards with connectors, in accordance with various embodiments. Card 500 is an embodiment of an M.2-1A compliant card, according to some embodiments, with cutouts 502. Card 550 is a legacy M.2 standard compliant card, with cutout 552. It will be noted that while cutout 502 is shorter than cutout 502, the overall length of card 500 and card 550 is identical at 42 mm, so that backwards compatibility between an M.2-1A socket and a legacy M.2 card is maintained, but the card 500, an embodiment of the M.2-1A interface 150, will not insert into a legacy M.2 socket. As discussed above, the notch on each card is positioned at the same physical location that corresponds with a screw or post, so that a card may only be secured into a socket with which it is physically compatible. FIG. 5 may show a WWAN example of 3042 designs, compliant with the M.2 standard specified for a 3042 design. FIG. 5 shows that an existing (legacy) M.2 3042 WWAN module will fit in new design and existing connector design, while the new M.2-1A will fit in the new 1 A connector but not fit into the existing M.2 connector. In this way, backward compatibility is maintained without risk of safety issues with new high power module in existing connectors.

Figure 6:
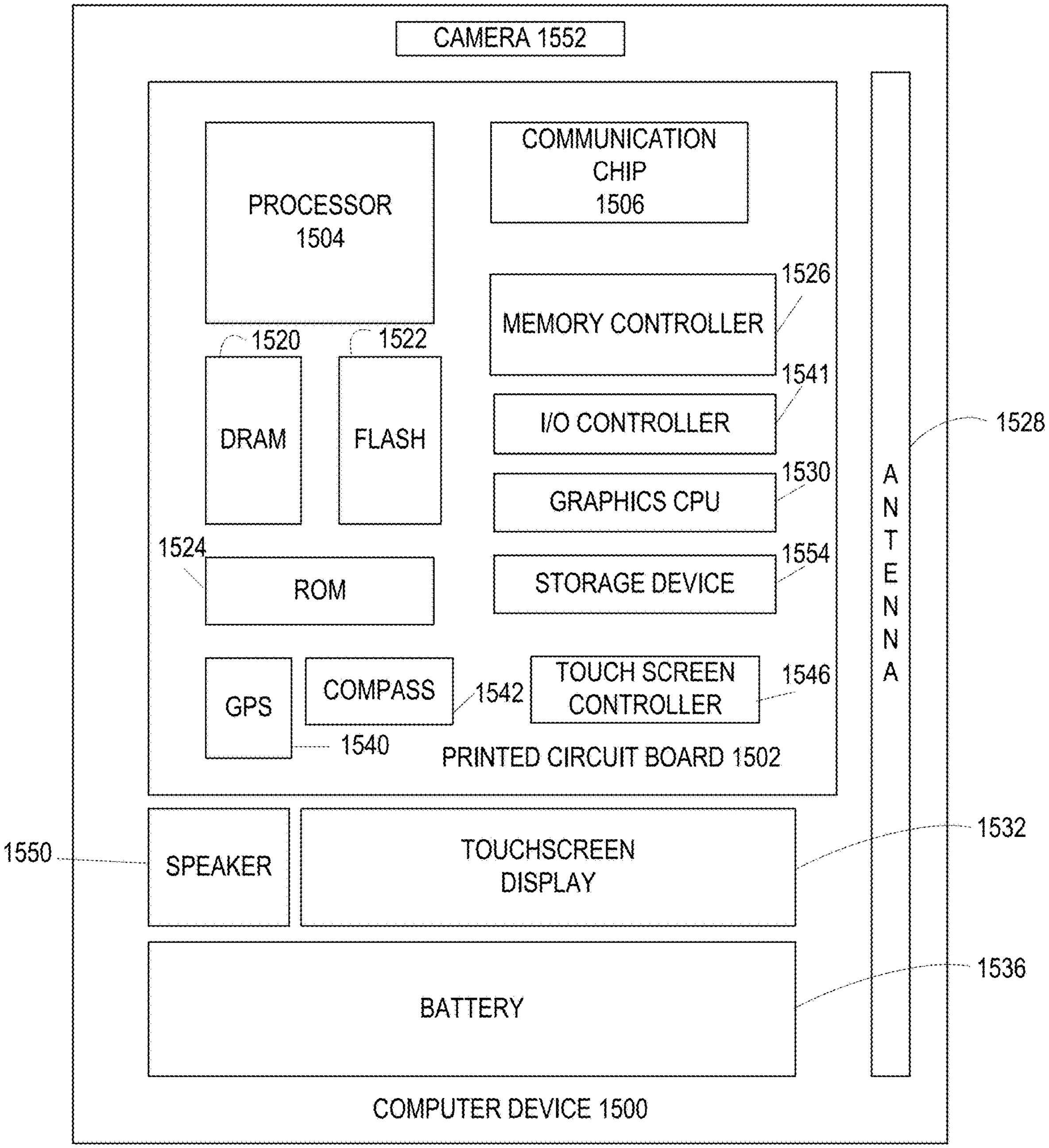
FIG. 6 is a block diagram of an example computer that can be used to implement or support some or all of the components of the M.2-1A interface, according to various embodiments.

FIG. 6 illustrates an example computer device 1500 that may be employed by or deployed with the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of the interface 150 or the components described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

EXAMPLES

Example 1 is a socket, comprising an opening configured to accept a first card wherein the first card conforms with the M.2 standard, the opening defined by first and second sides, wherein a first land is formed in the first side and a second land is formed in second side; a plurality of connector pins within the opening, wherein at least a subset of the plurality of connector pins are adapted to individually carry at least one amp of current; wherein the socket is keyed to accept and connect with the first card, and is keyed to accept and connect with a second card requiring at least one amp of current to be carried on a plurality of pins, the second card having a first cutout and a second cutout formed on the sides of an edge connector, the first and second recesses being 2.5 mm or less in depth, and corresponding to the first and second lands.

Example 2 includes the subject matter of example 1, or some other example herein, wherein individual connector pins of the subset of the plurality of connector pins comprise an alloy that can conduct at least one amp of current without exceeding 30 degrees C. temperature rise above ambient.

Example 3 includes the subject matter of example 2, or some other example herein, wherein the alloy comprises Copper, Nickel, Magnesium, and Silicon.

Example 4 includes the subject matter of any of examples 1-3, or some other example herein, wherein the socket is keyed to accept a communications card including a wireless wide area networking transceiver, WiFi transceiver, near-field communication transceiver, or WiGig transceiver card.

Example 5 includes the subject matter of any of examples 1-3, or some other example herein, wherein the socket is keyed to accept a storage card.

Example 6 includes the subject matter of any of examples 1-5, or some other example herein, wherein the socket type is one of a Socket 1, Socket 2, or Socket 3.

Example 7 is a card, comprising an edge connector formed from and extending from an edge of the card along a longitudinal axis of the card, the edge connector conformed with the M.2 standard at least with respect to width, keying, and pin arrangement; a plurality of pins disposed on the edge connector, at least a subset of the plurality of contacts adapted to individually carry at least one amp of current; and a key slot disposed in the edge connector, the key slot positioned in accordance with the M.2 standard; wherein the edge connector is defined by a first cutout disposed on a first side of the edge connector and a second cutout disposed on a second side of the edge connector, the first and second cutouts extending 2.5 mm or less in length along the longitudinal axis.

Example 8 includes the subject matter of example 7, or some other example herein, wherein individual pins of the subset of the plurality of pins comprise an alloy that can conduct at least one amp of current without exceeding 30 degrees C. temperature rise above ambient.

Example 9 includes the subject matter of example 8, or some other example herein, wherein the alloy comprises Copper, Nickel, Magnesium, and Silicon.

Example 10 includes the subject matter of any of examples 7-9, or some other example herein, wherein the card is keyed as a communications card, including a wireless wide area networking transceiver, WiFi transceiver, near-field communication transceiver, or WiGig transceiver card.

Example 11 includes the subject matter of any of examples 7-9, or some other example herein, wherein the card is keyed as a storage card.

Example 12 includes the subject matter of any of examples 7-11, or some other example herein, wherein the first and second cutouts each extend 2.25 mm.

Example 13 is a system, comprising a socket conforming to M.2 standard keying and connector pin configuration and capable of receiving an edge connector, the socket comprising a plurality of connector pins capable of carrying at least one amp of current while staying within M.2 standard thermal limits, the socket further comprising a land disposed on a first side and a second side; and a card conforming to M.2 standard keying and connector pin configuration, the card comprising a plurality of pins on an edge connector, each of the plurality of pins capable of carrying at least one amp of current while staying within M.2 standard thermal limits, the edge connector capable of connecting with the connector pins when inserted into the socket but not connecting with an M.2 standard compliant socket that has a protrusion on the first side and second side.

Example 14 includes the subject matter of example 13, or some other example herein, wherein the edge connector is comprised of a first cutout formed in a first side and a second cutout formed in a second side, the first and second cutouts being less than 2.5 mm in length.

Example 15 includes the subject matter of example 13 or 14, or some other example herein, wherein the first cutout and second cutout are 2.25 mm in length.

Example 16 includes the subject matter of any of examples 13-15, or some other example herein, wherein the system comprises a computer.

Example 17 includes the subject matter of any of examples 13-16, or some other example herein, wherein the card comprises a Wireless Wide Area Network module, a WiFi module, or a 5G cellular module.

Example 18 includes the subject matter of any of examples 13-16, or some other example herein, wherein the card comprises a storage module.

Example 19 includes the subject matter of any of examples 13-18, or some other example herein, wherein each of the plurality of connector pins and each of the plurality of pins comprise an alloy that can conduct at least one amp of current without exceeding 30 degrees C. temperature rise above ambient.

Example 20 includes the subject matter of claim 19, or some other example herein, wherein the alloy comprises Copper, Nickel, Magnesium, and Silicon.

What is claimed:

1. A socket, comprising:

an opening configured to accept a first card, wherein the first card conforms with the M.2 standard, the opening defined by first and second sides, and wherein a first land is formed in the first side and a second land is formed in the second side; and a plurality of connector pins within the opening, wherein at least a subset of the plurality of connector pins are adapted to individually carry at least one amp of current, and wherein the socket is keyed to accept and connect with the first card, and is keyed to accept and connect with a second card requiring at least one amp of current to be carried on a plurality of pins, the second card having a first recess and a second recess formed on the sides of an edge connector, and the first and second recesses being 2.5 mm or less in depth and corresponding to the first and second lands.

2. The socket of claim 1, wherein individual connector pins of the subset of the plurality of connector pins comprise an alloy capable of conducting at least one amp of current without exceeding a 30 degrees Celsius (C.) temperature rise above ambient.

3. The socket of claim 2, wherein the alloy comprises Copper, Nickel, Magnesium, and Silicon.

4. The socket of claim 1, wherein the socket is keyed to accept a communications card including a wireless wide area networking transceiver card, a WiFi transceiver card, a near-field communication transceiver card, or a WiGig transceiver card.

5. The socket of claim 1, wherein the socket is keyed to accept a storage card.

6. The socket of claim 1, wherein the socket type is one of a Socket 1, a Socket 2, or a Socket 3.

7. A card, comprising:

an edge connector formed from and extending from an edge of the card along a longitudinal axis of the card, the edge connector conforming with the M.2 standard at least with respect to width, keying, and pin arrangement;

a plurality of pins disposed on the edge connector, at least a subset of the plurality of pins being configured to individually carry at least one amp of current; and a key slot disposed in the edge connector, the key slot being positioned in accordance with the M.2 standard, wherein the edge connector is defined by a first cutout disposed on a first side of the edge connector and a second cutout disposed on a second side of the edge connector, the first and second cutouts extending 2.5 mm or less in length along the longitudinal axis.

8. The card of claim 7, wherein individual pins of the subset of the plurality of pins comprise an alloy capable of conducting at least one amp of current without exceeding a 30 degrees Celsius (C.) temperature rise above ambient.

9. The card of claim 8, wherein the alloy comprises Copper, Nickel, Magnesium, and Silicon.

10. The card of claim 7, wherein the card is keyed as a communications card, including a wireless wide area networking transceiver card, a WiFi transceiver card, a near-field communication transceiver card, or a WiGig transceiver card.

11. The card of claim 7, wherein the card is keyed as a storage card.

12. The card of claim 7, wherein the first and second cutouts each extend 2.25 mm.

13. A system, comprising:

a socket conforming to a M.2 standard keying and connector pin configuration and capable of receiving an edge connector, the socket comprising a plurality of connector pins capable of carrying at least one amp of current while staying within M.2 standard thermal limits, the socket further comprising a land disposed on a first side and a second side; and a card conforming to the M.2 standard keying and connector pin configuration, the card comprising a plurality of pins on an edge connector, each of the plurality of pins being capable of carrying at least one amp of current while staying within M.2 standard thermal limits, the edge connector being capable of connecting with the connector pins when inserted into the socket but not connecting with an M.2 standard compliant socket that has a protrusion on the first side and the second side.

14. The system of claim 13, wherein the edge connector is comprised of a first cutout formed in a first side and a second cutout formed in a second side, the first and second cutouts being less than 2.5 mm in length.

15. The system of claim 13, wherein the edge connector is comprised of a first cutout formed in a first side and a second cutout formed in a second side, and wherein the first cutout and the second cutout are 2.25 mm in length.

16. The system of claim 13, wherein the system comprises a computer.

17. The system of claim 16, wherein the card comprises a Wireless Wide Area Network module, a WiFi module, or a 5G cellular module.

18. The system of claim 16, wherein the card comprises a storage module.

19. The system of claim 13, wherein each of the plurality of connector pins and each of the plurality of pins comprise an alloy capable of conducting at least one amp of current without exceeding a 30 degrees Celcius (C.) temperature rise above ambient.

20. The system of claim 19, wherein the alloy comprises Copper, Nickel, Magnesium, and Silicon.

* * * * *